United States Patent
Iida

(10) Patent No.: US 8,205,435 B2
(45) Date of Patent: Jun. 26, 2012

(54) DETERIORATION DETERMINATION DEVICE FOR CATALYST, CATALYST DETERIORATION DETERMINING METHOD, AND ENGINE CONTROL UNIT

(75) Inventor: Jun Iida, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/482,102

(22) Filed: Jun. 10, 2009

(65) Prior Publication Data

US 2009/0308058 A1    Dec. 17, 2009

(30) Foreign Application Priority Data

Jun. 12, 2008  (JP) .................................. 2008/154214

(51) Int. Cl.
   *F01N 3/00* (2006.01)
(52) U.S. Cl. ................ 60/277; 60/274; 60/285; 60/286; 60/295; 60/301
(58) Field of Classification Search ............ 60/274, 60/277, 285–287, 295–301
   See application file for complete search history.

(56) References Cited

U.S. PATENT DOCUMENTS

| | | | | |
|---|---|---|---|---|
| 5,335,538 A | * | 8/1994 | Blischke et al. | 73/114.75 |
| 5,359,853 A | * | 11/1994 | Shimizu | 60/276 |
| 5,417,061 A | * | 5/1995 | Maeda et al. | 60/277 |
| 5,732,553 A | * | 3/1998 | Mitsutani | 60/276 |
| 5,822,982 A | * | 10/1998 | Mitsutani | 60/276 |
| 6,116,021 A | * | 9/2000 | Schumacher et al. | 60/274 |
| 6,244,046 B1 | * | 6/2001 | Yamashita | 60/285 |
| 6,295,807 B1 | * | 10/2001 | Douta et al. | 60/274 |
| 6,338,243 B1 | * | 1/2002 | Takaoka et al. | 60/277 |
| 6,922,985 B2 | * | 8/2005 | Wang et al. | 60/277 |
| 2004/0163381 A1 | | 8/2004 | Shirakawa | |
| 2007/0251213 A1 | * | 11/2007 | Saito et al. | 60/277 |

FOREIGN PATENT DOCUMENTS

| | | |
|---|---|---|
| JP | 2001-271696 A | 10/2001 |
| JP | 2004-257324 | 9/2004 |
| JP | 2007-092014 | 11/2007 |

* cited by examiner

*Primary Examiner* — Thomas Denion
*Assistant Examiner* — Jesse Bogue
(74) *Attorney, Agent, or Firm* — Arent Fox LLP

(57) ABSTRACT

A deterioration determination device for a catalyst, which is capable of accurately determining deterioration of a catalyst without being influenced by the response delays of outputs from the upstream and downstream oxygen concentration parameter sensors. The deterioration determination device includes upstream and downstream LAF sensors for detecting respective upstream and downstream oxygen concentration parameters. After switching exhaust gases flowing through the former parameter sensor into the catalyst to a reduction atmosphere, an upstream oxygen concentration parameter detected for comparison when a predetermined time period elapses after it exceeds a predetermined value is compared with a downstream oxygen concentration parameter detected for comparison when the predetermined time period elapses after it exceeds the predetermined value. Based results of the comparison, deterioration of the catalyst is determined.

12 Claims, 6 Drawing Sheets

DETERIORATION DETERMINATION DEVICE FOR CATALYST, CATALYST DETERIORATION DETERMINING METHOD, AND ENGINE CONTROL UNIT

BACKGROUND OF THE INVENTION

1. Field of the Invention

The present invention relates to a deterioration determination device for a catalyst, a catalyst deterioration-determining method, and an engine control unit, for determining deterioration of a catalyst for reducing exhaust emissions, which is provided in an exhaust passage of an internal combustion engine.

2. Description of the Related Art

Conventionally, there has been proposed a deterioration determination device of this kind in Japanese Laid-Open Patent Publication (Kokai) No. 2001-271696. In this deterioration determination device, by making use of characteristics of a catalyst that when the catalyst is deteriorated, the oxygen storage capability thereof, deterioration of the catalyst is determined as follows: Oxygen concentration is detected on an upstream side and a downstream side of the catalyst by an upstream oxygen sensor and a downstream oxygen sensor, respectively. Further, absolute values of the differences between values detected by the upstream oxygen sensor and values detected by the downstream oxygen sensor are integrated, and if the integrated value is smaller than a predetermined reference value, it is determined that the catalyst is deteriorated. Further, a time required for exhaust gases to reach the downstream oxygen sensor from the upstream oxygen sensor (hereinafter referred to as "the delay time") is calculated based on an intake air amount indicative of a flow velocity of exhaust gases, and in association with each value detected by the downstream oxygen sensor, each value detected by the upstream oxygen sensor before the delay time elapses is used for the calculation of the above-mentioned difference between the detected values by the respective sensors. Thus, in the conventional deterioration determination device, the values detected from substantially the same exhaust gases by the upstream oxygen sensor and the downstream oxygen sensor are used for the deterioration determination.

However, in the above-described conventional deterioration determination device, merely the above-described delay time of the exhaust gasses is added to the deterioration determination of the catalyst, and hence there is a fear that it is impossible to accurately determine deterioration of the catalyst due to influence of variation in output characteristics caused by differences between individual products of the upstream and downstream oxygen sensors, variation in exposure to exhaust gases caused by different mounting conditions of the sensors, response delays caused by aging of both the sensors, and so forth. Particularly, since the integrated value of the differences between the values detected by the upstream oxygen sensor and the values detected by the downstream oxygen sensor is used for the deterioration determination, even if the deviation of an output value from a true value caused by variation in output characteristics of the both sensors is relatively small, this greatly influences the calculated integrated value. In this case, the accuracy of the deterioration determination is much lowered.

To prevent such a problem, for example, it is envisaged to compensate for the influence of variation in output characteristics of the upstream and downstream oxygen sensors on the deterioration determination of catalyst. However, in this case, if the degree of aging of the upstream and downstream oxygen sensors is high enough to definitely determine the aging, it is possible to properly compensate for the influence according to the result of the determination. However, if the degree of aging of the both sensors is low, the deviation from the true value is also small, and hence it is impossible to properly compensate for the influence of variation in the output characteristics on deterioration determination of the catalyst. This makes it impossible to accurately determine deterioration of the catalyst. This fact is similarly applied to the influence of variation in output characteristics due to differences between the individual products of the upstream and downstream oxygen sensors, different mounting conditions of the sensors, on the deterioration determination of the catalyst.

SUMMARY OF THE INVENTION

It is an object of the present invention to provide a deterioration determination device for a catalyst, a catalyst deterioration-determining method, and an engine control unit, which are capable of accurately determining deterioration of a catalyst without being influenced by the response delays of outputs from the upstream and downstream oxygen concentration parameter sensors.

To attain the above object, in a first aspect of the present invention, there is provided a deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, comprising an upstream oxygen concentration parameter sensor that detects an upstream oxygen concentration parameter indicative of an oxygen concentration in exhaust gases on an upstream side of the catalyst in the exhaust passage, a downstream oxygen concentration parameter sensor that detects a downstream oxygen concentration parameter indicative of an oxygen concentration in the exhaust gases on a downstream side of the catalyst in the exhaust passage, control means capable of controlling the exhaust gases flowing through the upstream oxygen concentration parameter sensor into the catalyst, between the oxidation atmosphere and the reduction atmosphere, and deterioration determining means for determining deterioration of the catalyst based on a result of comparison between the upstream oxygen concentration parameter for comparison which is detected when a predetermined time period elapses after the upstream oxygen concentration parameter exceeds a predetermined value, and the downstream oxygen concentration parameter for comparison which is detected when the predetermined time period elapses after the downstream oxygen concentration parameter exceeds the predetermined value, after the control means switches the exhaust gases from the oxidation atmosphere to the reduction atmosphere.

With the configuration of this deterioration determination device for a catalyst according to the first aspect of the present invention, the upstream and downstream oxygen concentration parameters indicative of respective oxygen concentrations in exhaust gases on the upstream side and the downstream side of the catalyst in the exhaust passage are detected by the upstream oxygen concentration parameter sensor and the downstream oxygen concentration parameter sensor, respectively. Exhaust gases which flow through the upstream oxygen concentration parameter sensor into the catalyst is controlled between the oxidation atmosphere and the reduction atmosphere by the control means. Further, after the exhaust gases are switched from the oxidation atmosphere to the reduction atmosphere by the control means, the deterioration of the catalyst is determined by the deterioration determining means based on a result of comparison between the upstream oxygen concentration parameter for comparison which is detected when a predetermined time period elapses after the upstream oxygen concentration parameter exceeds a predetermined value, and the downstream oxygen concentration parameter for comparison which is detected when the predetermined time period elapses after the downstream oxygen concentration parameter exceeds the predetermined value.

When the exhaust gases flowing into the catalyst are switched from the oxidation atmosphere to the reduction atmosphere, the exhaust gases on the upstream side of the catalyst are immediately changed thereafter from the oxidation atmosphere to the reduction atmosphere. On the other hand, as for exhaust gases on the downstream side, if the catalyst is not deteriorated, oxygen stored when the exhaust gases form the oxidation atmosphere is released from the catalyst to oxidize reducing agents in the exhaust gases. Therefore, the exhaust gases are changed to the reduction atmosphere, not immediately, but later than the exhaust gases on the upstream side. Further, the oxygen concentration in the exhaust gases has a correlation with the concentration of reducing agents in the exhaust gases. From the above, by determining deterioration of the catalyst based on the result of comparison between the upstream and downstream oxygen concentration parameters which are detected after switching the exhaust gases to the reduction atmosphere, it is possible to properly carry out the deterioration determination of the catalyst.

Further, in this case, as a target for comparison for the deterioration determination, not the upstream and downstream oxygen concentration parameters which are detected immediately after the exhaust gases are changed to the reduction atmosphere, but the upstream and downstream oxygen concentration parameters are used which are detected when the common predetermined time period elapses after they exceed the common predetermined value. Thus, with reference to timings at which the upstream and downstream oxygen concentration parameters actually exceed the common predetermined value, both the parameters which are obtained upon the lapse of the common predetermined time period after the respective timings are compared with each other. Therefore, even if there occurs a problem of the response delay of an output caused by the difference between individual products of the upstream and downstream oxygen concentration parameter sensors, different mounting conditions thereof, or the aging of both the sensors, it is possible to use the values detected from substantially the same exhaust gases by the upstream and downstream oxygen concentration parameter sensors without being affected by the response delay, irrespective of length of time required for exhaust gases to reach the downstream oxygen concentration sensor from the upstream oxygen concentration sensor. Therefore, this makes it possible to accurately determine the deterioration of the catalyst.

Preferably, the deterioration determination device further comprises steady state-determining means for determining whether or not the downstream oxygen concentration parameter reaches a steady state after switching of the exhaust gases, and the upstream and downstream oxygen concentration parameters for comparison are detected within a time period after the switching of the exhaust gases until it is determined that the downstream oxygen concentration parameter reaches the steady state.

With the configuration of this preferred embodiment, it is determined by the steady state-determining means whether or not the downstream oxygen concentration sensor has reached a steady state after the switching of the exhaust gases. Further, as the upstream and downstream oxygen concentration parameters for comparison, values are used which have been obtained until the downstream oxygen concentration parameter reaches the steady state, that is, until the oxygen is completely released from the catalyst in response to the switching of the exhaust gases to the reduction atmosphere. This makes it possible to properly carry out the comparison between the upstream and downstream oxygen concentration parameters for comparison, for the deterioration determination of the catalyst.

Preferably, the upstream oxygen concentration parameter for comparison comprises a plurality of values of the upstream oxygen concentration parameter which are detected at predetermined intervals after the upstream oxygen concentration parameter exceeds the predetermined value, and the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

With the configuration of this preferred embodiment, a plurality of values of the upstream oxygen concentration parameter which are detected at the predetermined intervals after the upstream oxygen concentration parameter exceeds the predetermined value are used as the upstream oxygen concentration parameter for comparison. Further, the plurality of values of the downstream oxygen concentration parameters equal in number to the number of the plurality of values of the upstream oxygen concentration parameter which are detected at the predetermined intervals after the downstream oxygen concentration parameter exceeds the predetermined value are used as the downstream oxygen concentration parameter for comparison. The deterioration of the catalyst is determined based on a result of comparison between these upstream and downstream oxygen concentration parameters for comparison. Furthermore, in comparing these upstream and downstream oxygen concentration parameters, the respective same numbers of values of the upstream and downstream oxygen concentration parameters are used which are detected at the same timing with reference to respective timings at which the parameters exceed the common predetermined value. Therefore, it is possible to properly carry out comparison of both the parameters for the deterioration determination of the catalyst in a fine-grained manner.

More preferably, the deterioration determination device further comprises upstream oxygen concentration parameter integrated value-calculating means for calculating an integrated value of the plurality of values of the upstream oxygen concentration parameter as the upstream oxygen concentration parameter for comparison, and downstream oxygen concentration parameter integrated value-calculating means for calculating an integrated value of the plurality of values of the downstream oxygen concentration parameter as the downstream oxygen concentration parameter for comparison, wherein the deterioration determining means carries out the deterioration determination based on a result of comparison between the integrated value of the upstream oxygen concentration parameter and the integrated value of the downstream oxygen concentration parameter.

With the configuration of this preferred embodiment, the integrated value of the plurality of the upstream oxygen concentration parameters which are detected at the predetermined intervals after the upstream oxygen concentration parameter exceeds the predetermined value is calculated as the upstream oxygen concentration parameter for comparison by the upstream oxygen concentration parameter integrated value-calculating means. Further, the integrated value of the same number of values of the downstream oxygen concentration parameters as that of the plurality of the upstream oxygen concentration parameter, which are detected at the predetermined intervals after the downstream oxygen concentration parameter exceeds the predetermined value is calculated as the downstream oxygen concentration parameter for comparison by the downstream oxygen concentration parameter integrated value-calculating means. Further, the deterioration of the catalyst is determined based on a result of comparison between the integrated value of the upstream oxygen concentration parameters and the integrated value of the downstream oxygen concentration parameters. From the above, even in a case where the upstream and downstream oxygen concentration parameters are temporarily fluctuated due to a disturbance or the like, it is possible to suppress the influence of the fluctuation on the deterioration determination.

To attain the above object, in a second aspect of the present invention, there is provided a catalyst deterioration-determining method for a deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, the deterioration determination device including an upstream oxygen concentration parameter sensor that detects an upstream oxygen concentration parameter indicative of an oxygen concentration in exhaust gases on an upstream side of the catalyst in the exhaust passage, a downstream oxygen concentration parameter sensor that detects a downstream oxygen concentration parameter indicative of an oxygen concentration in the exhaust gases on a downstream side of the catalyst in the exhaust passage, and control means capable of controlling the exhaust gases flowing through the upstream oxygen concentration parameter sensor into the catalyst, between the oxidation atmosphere and the reduction atmosphere, the catalyst deterioration-determining method comprising switching the exhaust gases from the oxidation atmosphere to the reduction atmosphere, detecting the upstream oxygen concentration parameter, detecting the downstream oxygen concentration parameter; and determining deterioration of the catalyst based on a result of comparison between the upstream oxygen concentration parameter for comparison which is detected when a predetermined time period elapses after the upstream oxygen concentration parameter exceeds a predetermined value, and the downstream oxygen concentration parameter for comparison which is detected when the predetermined time period elapses after the downstream oxygen concentration parameter exceeds the predetermined value.

With the configuration of the catalyst deterioration-determining method according to the second aspect of the present invention, it is possible to obtain the same advantageous effects as provided by the first aspect of the present invention.

Preferably, the catalyst deterioration-determining method further comprises determining whether or not the downstream oxygen concentration parameter reaches a steady state after switching of the exhaust gases, and the upstream and downstream oxygen concentration parameters for comparison are detected within a time period after the switching of the exhaust gases until it is determined that the downstream oxygen concentration parameter reaches the steady state.

Preferably, the upstream oxygen concentration parameter for comparison comprises a plurality of values of the upstream oxygen concentration parameter which are detected at predetermined intervals after the upstream oxygen concentration parameter exceeds the predetermined value, and the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

More preferably, the catalyst deterioration-determining method further comprises calculating an integrated value of the plurality of values of the upstream oxygen concentration parameter as the upstream oxygen concentration parameter for comparison, and calculating an integrated value of the plurality of values of the downstream oxygen concentration parameter as the downstream oxygen concentration parameter for comparison, wherein the determining is executed based on a result of comparison between the integrated value of the upstream oxygen concentration parameter and the integrated value of the downstream oxygen concentration parameter.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a computer to execute a catalyst deterioration-determining method for a deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, the deterioration determination device including an upstream oxygen concentration parameter sensor that detects an upstream oxygen concentration parameter indicative of an oxygen concentration in exhaust gases on an upstream side of the catalyst in the exhaust passage, a downstream oxygen concentration parameter sensor that detects a downstream oxygen concentration parameter indicative of an oxygen concentration in the exhaust gases on a downstream side of the catalyst in the exhaust passage, and control means capable of controlling the exhaust gases flowing through the upstream oxygen concentration parameter sensor into the catalyst, between the oxidation atmosphere and the reduction atmosphere, wherein the catalyst deterioration-determining method comprises switching the exhaust gases from the oxidation atmosphere to the reduction atmosphere, detecting the upstream oxygen concentration parameter, detecting the downstream oxygen concentration parameter, and determining deterioration of the catalyst based on a result of comparison between the upstream oxygen concentration parameter for comparison which is detected when a predetermined time period elapses after the upstream oxygen concentration parameter exceeds a predetermined value, and the downstream oxygen concentration parameter for comparison which is detected when the predetermined time period elapses after the downstream oxygen concentration parameter exceeds the predetermined value.

With the configuration of the engine control unit according to the third aspect of the present invention, it is possible to obtain the same advantageous effects as provided by the first aspect of the present invention.

Preferably, the catalyst deterioration-determining method further comprises determining whether or not the downstream oxygen concentration parameter reaches a steady state after switching of the exhaust gases, and the upstream and downstream oxygen concentration parameters for comparison are detected within a time period after the switching of the exhaust gases until it is determined that the downstream oxygen concentration parameter reaches the steady state.

Preferably, the upstream oxygen concentration parameter for comparison comprises a plurality of values of the upstream oxygen concentration parameter which are detected at predetermined intervals after the upstream oxygen concentration parameter exceeds the predetermined value, and the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

More preferably, the catalyst deterioration-determining method further comprises calculating an integrated value of the plurality of values of the upstream oxygen concentration parameter as the upstream oxygen concentration parameter for comparison, and calculating an integrated value of the plurality of values of the downstream oxygen concentration parameter as the downstream oxygen concentration parameter for comparison, wherein the determining is executed based on a result of comparison between the integrated value of the upstream oxygen concentration parameter and the integrated value of the downstream oxygen concentration parameter.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
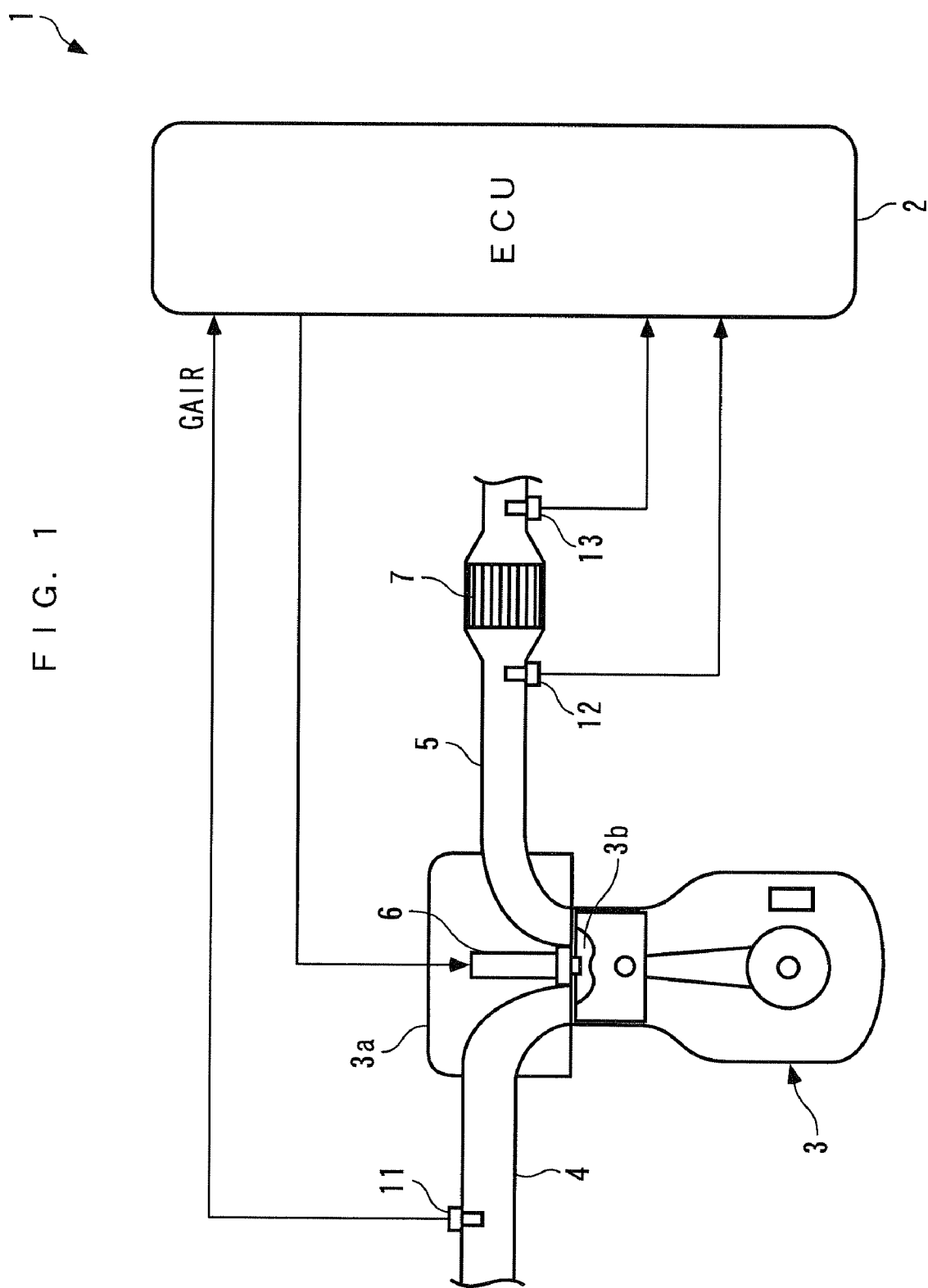
FIG. 1 is a schematic diagram of a deterioration determination device for a catalyst according to an embodiment of the present invention, and an internal combustion engine to which the deterioration determination device is applied.

The invention will now be described in detail with reference to the drawings showing a preferred embodiment thereof. FIG. 1 schematically shows a catalyst deterioration determination device 1 according to the present embodiment, and an internal combustion engine 3 to which the deterioration determination device 1 is applied. The internal combustion engine (hereinafter simply referred to as "the engine") 3 is a diesel engine that is installed on a vehicle, not shown.

A cylinder head 3a of the engine 3 has an intake pipe 4 and an exhaust pipe 5 (exhaust passage) connected thereto, with a fuel injection valve (hereinafter referred to as "the injector") 6 mounted therethrough such that it faces a combustion chamber 3b.

The injector 6 is inserted into the combustion chamber 3b through a central portion of the top wall thereof, and injects fuel from a fuel tank into the combustion chamber 3b. The amount (fuel injection amount) of fuel to be injected from the injector 6 is set by an ECU 2, referred to hereinafter, and a valve-opening time period of the injector 6 is controlled by a drive signal from the ECU 2, such that the set fuel injection amount is obtained.

Further, the intake pipe 4 has an air flow sensor 11 inserted therein, which detects the amount (intake air amount) GAIR of intake air sucked into the engine 3, to deliver a signal indicative of the sensed intake air amount GAIR to the ECU 2.

A catalyst 7 which is formed e.g. by a three-way catalyst is provided in the exhaust pipe 5. If exhaust gases flowing through the exhaust pipe 5 form an oxidation atmosphere in which the oxygen concentration is high, the catalyst 7 stores oxygen in the exhaust gases. On the other hand, if exhaust gases contain lots of HC and CO and form a reduction atmosphere in which the oxygen concentration is low, the catalyst 7 releases the stored oxygen, and reduces exhaust emissions by oxidizing HC and CO in the exhaust gases by the released oxygen.

An upstream LAF sensor 12 and a downstream LAF sensor 13 are provided in the exhaust pipe 5 at respective locations upstream and downstream of the catalyst 7. The upstream LAF sensor 12, which is comprised of zirconia, linearly detects oxygen concentration (hereinafter referred to as "the upstream oxygen concentration") in exhaust gases on the upstream side of the catalyst 7 over a wide range from a rich region to a lean region of the air-fuel ratio of a mixture supplied to the engine 3, and delivers an output which is proportional to the upstream oxygen concentration to the ECU 2.

The ECU 2 calculates a first equivalent ratio KACT1 indicative of a ratio between the concentration of reducing agents, such as HC and CO, and the concentration of oxygen in exhaust gases on the upstream side of the catalyst 7 at predetermined intervals (e.g. of 10 msec), based on the output from the upstream LAF sensor 12. In this case, the first equivalent ratio KACT1 is calculated as a so-called equivalent ratio (ratio between a fuel-air ratio and a stoichiometric fuel-air ratio of a mixture), regarding the reducing agents as fuel. Thus, when the upstream oxygen concentration is equivalent to the stoichiometric fuel-air ratio, the first equivalent ratio KACT1 is equal to 1.0, when the upstream oxygen concentration is smaller than a value which is equivalent to the stoichiometric fuel-air ratio, the first equivalent ratio KACT1 is larger than 1.0, and when the upstream oxygen concentration is higher than a value which is equivalent to the stoichiometric fuel-air ratio, the first equivalent ratio KACT1 is smaller than 1.0.

The above-described downstream LAF sensor 13, which is comprised of zirconia, similarly to the upstream LAF sensor 12, linearly detects oxygen concentration (hereinafter referred to as "the downstream oxygen concentration") in exhaust gases on the downstream side of the catalyst 7 over a wide range from the rich region to the lean region of the air-fuel ratio of the mixture supplied to the engine 3, and delivers an output which is proportional to the downstream oxygen concentration to the ECU 2.

The ECU 2 calculates a second equivalent ratio KACT2 indicative of a ratio between the concentration of reducing agents and the concentration of oxygen in exhaust gases on the downstream side of the catalyst 7, based on the output from the downstream LAF sensor 13 at the above-mentioned predetermined intervals. In this case, similarly to the first equivalent ratio KACT1, the second equivalent ratio KACT2 is calculated as an equivalent ratio, regarding the reducing agents as fuel. Thus, the second equivalent ratio KACT2 becomes a similar value to the first equivalent ratio KACT1 according to the relationship between the downstream oxygen concentration and the stoichiometric fuel-air ratio.

The ECU 2 is implemented by a microcomputer comprised of an I/O interface, a CPU, a RAM, and a ROM. The detection signals from the aforementioned sensors 11 to 13 are input to the CPU after the I/O interface performs A/D conversion and waveform shaping thereon. In response to these input signals, the ECU 2 determines operating conditions of the engine 3 according to a control program stored in the ROM, and carries out the control of the fuel injection amount by the injector 6, and the deterioration determination process for determining deterioration of the catalyst 7, according to the determined operating conditions of the engine.

It should be noted that in the present embodiment, the ECU 2 corresponds to control means, deterioration determining means, steady state-determining means, upstream oxygen concentration parameter integrated value-calculating means, and downstream oxygen concentration parameter integrated value-calculating means, in the present invention. Further, the injector 6 corresponds to the control means in the present invention. Furthermore, the upstream and downstream LAF sensors 12 and 13 correspond to upstream and downstream oxygen concentration parameter sensors in the present invention, respectively. Moreover, the first and second equivalent ratios KACT1 and KACT2 correspond to upstream and downstream oxygen concentration parameters in the present invention, respectively.

Figure 3:
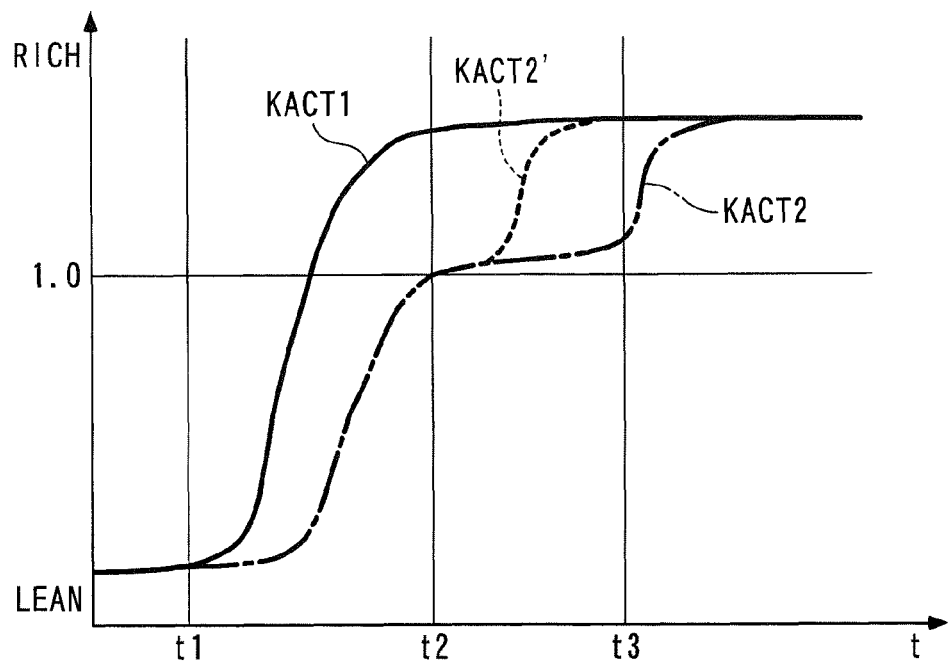
FIG. 3 shows an example of changes in first and second equivalent ratios in a case where the catalyst is not deteriorated and a case where the catalyst is deteriorated.

Next, a description will be given of a basic principle of the deterioration determination of the catalyst 7 which is carried out in the deterioration determination process, with reference to FIG. 3. A solid line and a dashed-dot line show respective examples of changes in the first and second equivalent ratios KACT1 and KACT2 occurring when exhaust gases are switched from the oxidation atmosphere in which the first equivalent ratio KACT1 is less than 1.0 corresponding to the stoichiometric fuel-air ratio to the reduction atmosphere such that the first equivalent ratio KACT1 becomes equal to a predetermined target equivalent ratio which is larger than 1.0, in a case where the catalyst 7 is not deteriorated. As shown in FIG. 3, after the exhaust gases are switched to the reduction atmosphere (time point t1), the first equivalent ratio KACT1 rises to become larger than 1.0, and converge to the target equivalent ratio, thereby reaching the steady state.

Further, the second equivalent ratio KACT2 rises later than the first equivalent ratio KACT1 by a time period required for the exhaust gases to reach from the upstream LAF sensor 12 to the downstream LAF sensor 13, until the second equivalent ratio KACT2 exceeds 1.0 (time point t1 to time point t2). Then, when the second equivalent ratio KACT2 exceeds 1.0 (time point t2), the oxygen concentration in the vicinity of the catalyst 7 becomes lower than the oxygen concentration in the inside thereof, and hence the oxygen stored in the catalyst 7 is released such that the equilibrium of the oxygen concentration is maintained, and the reducing agents in the exhaust gases are oxidized by the released oxygen. As a result, the second equivalent ratio KACT2 does not rise but remains in a state where it slightly exceeds 1.0 (time point t2 to time point t3). Then, when the oxygen stored in the catalyst 7 is completely released (after the time point t3), the second equivalent ratio KACT2 rapidly rises, and then converges to the target equivalent ratio to reach the steady state, similarly to the first equivalent ratio KACT1.

On the other hand, if the catalyst 7 is deteriorated, since the oxygen storage capability of the catalyst 7 is degraded, the reducing agents in exhaust gases flow into the downstream side, without being oxidized by the catalyst 7 for so long a time period. Therefore, the second equivalent ratio KACT2 reaches the steady state earlier than the case where the catalyst 7 is not deteriorated, depending on the degree of deterioration of the catalyst 7, as indicated by a dashed line (KACT2') in FIG. 3.

According to the characteristics of the catalyst 7 described as above, in the deterioration determination process according to the present embodiment, the amount of the reducing agents which have been oxidized by oxygen released from the catalyst 7 when exhaust gases form the reduction atmosphere is calculated as an oxygen storage capability OSC indicative of the capacity of oxygen storage of the catalyst 7 based on the first and second equivalent ratios KACT1 and KACT2, and the deterioration of the catalyst 7 is determined based on the calculated oxygen storage capability OSC.

Figure 2:
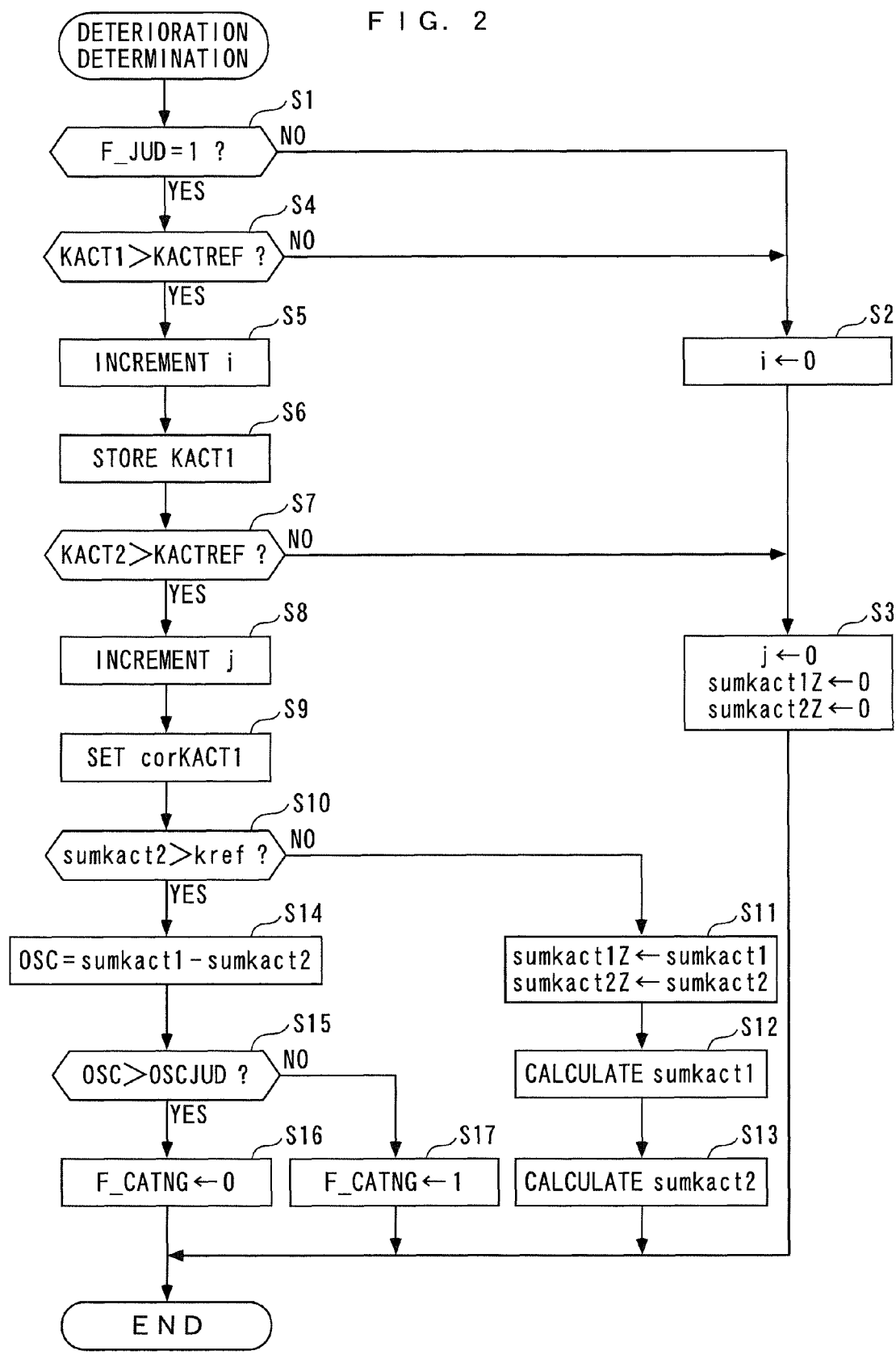
FIG. 2 is a flowchart of a deterioration determination process.

FIG. 2 is a flowchart of this deterioration determination process. The present process is executed at the above-mentioned predetermined intervals, similarly to the calculation of the first and second equivalent ratios KACT1 and KACT2. Further, when the deterioration determination process is carried out, the air-fuel ratio control of the mixture as is carried out in the following manner: In the engine 3, the air-fuel ratio of the supplied mixture is usually controlled to a leaner value than the stoichiometric air-fuel ratio by the fuel injection amount control by the ECU 2, whereby exhaust gases are controlled to the oxidation atmosphere in which the first equivalent ratio KACT1 is smaller than 1.0. By controlling the air-fuel ratio of the engine 3 to a richer value than the stoichiometric air-fuel ratio from this state when the deterioration determination process is carried out, the exhaust gases are switched to the reduction atmosphere such that the first equivalent ratio KACT1 becomes equal to the above-mentioned target equivalent ratio, and are maintained in the state. The control of switching exhaust gases from the oxidation atmosphere to the reduction atmosphere and maintaining the state of exhaust gases is hereinafter referred to as "the exhaust gas reduction control". Further, the deterioration determination process is carried out on condition that the engine 3 is in a predetermined stable operating condition, and the ECU 2 and the sensors 11 to 13 are normally operating.

Referring to FIG. 2, first, in a step 1 (shown as S1 in abbreviated form in FIG. 2; the following steps are also shown in abbreviated form), it is determined whether or not a reduction control flag F_JUD is equal to 1. The reduction control flag F_JUD is set to 1 during the exhaust gas reduction control. If the answer to the question of the step 1 is negative (NO), i.e. if F_JUD=0 holds, which means that the reduction control is not being carried out, a buffer number i, referred to hereinafter, is reset to 0 (step 2), and a counter value j of a counter, an immediately preceding value sumkact1Z of a first reducing agent amount integrated value, and an immediately preceding value sumkact2Z of a second reducing agent amount integrated value, referred to hereinafter, are all reset to 0 (step 3), followed by terminating the present process.

On the other hand, if the answer to the question of the step 1 is affirmative (YES), which means that the exhaust gas reduction control is being carried out, it is determined whether or not the first equivalent ratio KACT1 is larger than a predetermined value KACTREF (step 4). The predetermined value KACTREF is set to a value which is slightly less than 1.0 equivalent to the stoichiometric fuel-air ratio, i.e. a slightly leaner value (the reducing agents are less). If the answer to the question of the step 4 is negative (NO), i.e. if the first equivalent ratio KACT1 is not more than the predetermined value KACTREF, the above-mentioned step 2 et seq. are executed, followed by terminating the present process without determining deterioration of the catalyst 7.

On the other hand, if the answer to the question of the step 4 is affirmative (YES), i.e. if the first equivalent ratio KACT1 is larger than the predetermined value KACTREF, the buffer number i of a first ring buffer of the ECU 2 for storing the first equivalent ratio KACT1 is incremented (step 5). Then, the calculated current first equivalent ratio KACT1 is stored in a storage area of the first ring buffer, which is defined by the buffer number i incremented in the step 5 (step 6).

By executing the above-mentioned steps 2, and 4 to 6, after the first equivalent ratio KACT1 exceeds the predetermined value KACTREF, values of the first equivalent ratio KACT1 which are calculated at the predetermined intervals as described above are stored in the storage area having the buffer number i of the first ring buffer at the predetermined intervals. In this case, in the first ring buffer, a newer first equivalent ratio KACT1 is stored in a storage area having a larger buffer number i.

In a step 7 following the step 6, it is determined whether or not the second equivalent ratio KACT2 is larger than the predetermined value KACTREF. If the answer to the question of the step 7 is negative (NO), the step 3 is executed, followed by terminating the present process without determining deterioration of the catalyst 7.

On the other hand, if the answer to the question of the step 7 is affirmative (YES), i.e. if the second equivalent ratio KACT2 is larger than the predetermined value KACTREF, the counter value j of the above-mentioned counter is incremented (step 8). Then, out of the values of the first equivalent ratios KACT1 which are stored in the above-mentioned first ring buffer, a value of the first equivalent ratio KACT1 which is stored in the storage area having the buffer number i having the same value as the counter value j incremented in the step 8 is set to a synchronized first equivalent ratio corKACT1 (step 9). It should be noted that the synchronized first equivalent ratio corKACT1 is reset to 0 at the start of the present process.

After the second equivalent ratio KACT2 exceeds the predetermined value KACTREF by executing the steps 3, and 7 to 9, values of the first equivalent ratio KACT1 sequentially stored after it exceeds the predetermined value KACTREF are set to respective values of the synchronized first equivalent ratio corKACT1, in a sequence starting from the oldest.

In a step 10 following the step 9, it is determined whether or not a second reducing agent amount integrated value sumkact2 calculated then is larger than a predetermined threshold kref. If the answer to the question of the step 10 is negative (NO), the first and second reducing agent amount integrated values sumkact1 and sumkact2 at the time are respectively shifted as the immediately preceding values sumkact1Z and sumkact2Z of them (step 11). Then, the first reducing agent amount integrated value sumkact1 is calculated by using the immediately preceding value sumkact1Z of the first reducing agent amount integrated value shifted in the step 11, and the synchronized first equivalent ratio corKACT1 set in the step 9 (step 12).

The calculation of the first reducing agent amount integrated value sumkact1 is carried out in the following manner: If the synchronized first equivalent ratio corKACT1 is larger than 1.0, which means that exhaust gases form the reduction atmosphere, the first reducing agent amount integrated value sumkact1 is calculated by an equation (1) mentioned hereafter, using the detected intake air amount GAIR, in addition to the immediately preceding value sumkact1Z and the synchronized first equivalent ratio corKACT1. On the other hand, if the synchronized first equivalent ratio corKACT1 is not more than 1.0, which means that exhaust gases are not in the reduction atmosphere, the immediately preceding value sumkact1Z of the first reducing agent amount integrated value is directly set to the current first reducing agent amount integrated value sumkact1.

$$sumkact1 = sumkact1Z + (corKACT1 - 1.0)GAIR \quad (1)$$

As is clear from the above-described setting method, the synchronized first equivalent ratio corKACT1 indicates a ratio between the concentration of reduction agents in exhaust gases on the upstream side of the catalyst 7 and the concentration of oxygen in the same. Therefore, the (corKACT1−1.0)GAIR in the above-mentioned equation (1) indicates an excess (amount corresponding to a richer degree) of the reducing agents with respect to the amount of oxygen, determined with reference to the stoichiometric fuel-air ratio, in the exhaust gases on the upstream side of the catalyst 7 (hereinafter referred to as "the upstream excess reducing agent amount") at respective times. As is clear from this fact, the steps 2 to 6, 11, and the equation (1), the first reducing agent amount integrated value sumkact1 indicates an integrated value of the upstream excess reducing agent amount which is supplied to the catalyst 7 after the first equivalent ratio KACT1 exceeds the predetermined value KACTREF.

Further, in a step 13 following the step 12, the second reducing agent amount integrated value sumkact2 is calculated using the immediately preceding value sumkact2Z of the second reducing agent amount integrated value set in the step 11, and the second equivalent ratio KACT2 and the intake air amount GAIR detected at the time, followed by terminating the present process. The calculation of the second reducing agent amount integrated value sumkact2 is carried out in the following manner: If the second equivalent ratio KACT2 is not more than 1.0, the immediately preceding value sumkact2Z of the second reducing agent amount integrated value is directly set to the current second reducing agent amount integrated value sumkact2. On the other hand, if the second equivalent ratio KACT2 is larger than 1.0, the second reducing agent amount integrated value sumkact2 is calculated by the following equation (2):

$$sumkact2 = sumkact2Z + (KACT2 - 1.0)GAIR \quad (2)$$

The second equivalent ratio KACT2 indicates a ratio between the concentration of reducing agents and the concentration of oxygen in the exhaust gases on the downstream side of the catalyst 7, as described above. Therefore, the (KACT2−1.0)GAIR in the above-mentioned equation (2) indicates an excess (amount corresponding to a richer degree) of the reducing agents with respect to the amount of oxygen, determined with reference to the stoichiometric fuel-air ratio, in the exhaust gases on the downstream side of the catalyst 7 (hereinafter referred to as "the downstream excess reducing agent amount") at respective times. As is clear from this fact, the steps 3, 7 to 9, 11, and the equation (2), the second reducing agent amount integrated value sumkact2 indicates an integrated value of the downstream excess reducing agent amount of exhaust gases flowing from the catalyst 7 into the downstream side after the second equivalent ratio KACT2 exceeds the predetermined value KACTREF.

Further, the predetermined threshold kref in the step 10 is used for determining whether or not the second equivalent ratio KACT2 has converged to the above-mentioned target equivalent ratio and reached the steady-state, i.e. the oxygen stored in the catalyst 7 has been completely released, and is set in the following manner: A value of the second reducing agent amount integrated value sumkact2 obtained after switching exhaust gases to the reduction atmosphere until the second equivalent ratio KACT2 converges to the above-mentioned target equivalent ratio and reaches the steady state is empirically determined, and the above-mentioned threshold kref is set to the thus determined value of the second reducing agent amount integrated value sumkact2.

On the other hand, if the answer to the question of the step 10 is affirmative (YES), i.e. if sumkact2>kref holds, which means that the second equivalent ratio KACT2 has reached the steady state and the oxygen stored in the catalyst 7 has been completely released, the catalyst oxygen storage capability OSC is calculated by subtracting the second reducing agent amount integrated value sumkact2 from the first reducing agent amount integrated value sumkact1 (step 14). The catalyst oxygen storage capability OSC calculated as above represents an oxygen storage capacity of the catalyst 7. A description will be given of this point hereinafter.

As described above, if the second equivalent ratio KACT2 exceeds 1.0 equivalent to the stoichiometric fuel-air ratio by the switching of exhaust gases to the reduction atmosphere, the catalyst 7 releases oxygen stored therein, and oxidizes reducing agents in exhaust gases by the released oxygen. Further, if the oxygen stored in the catalyst 7 has been completely released, the second equivalent ratio KACT2 converges to the target equivalent ratio, thereby reaching the steady state.

Further, by executing the step 10, the calculation of the second reducing agent amount integrated value sumkact2 in the step 13 is carried out after the second equivalent ratio KACT2 becomes larger than the predetermined value KACTREF until it converges to the target equivalent ratio. Therefore, the second reducing agent amount integrated value sumkact2 used for the calculation of the catalyst oxygen storage capability OSC represents an integrated value of a plurality of values of the downstream excess reducing agent amount (excess of reducing agents with respect to the amount of oxygen, determined with reference to the stoichiometric fuel-air ratio, in exhaust gases flowing from the catalyst 7 into the downstream side) which are calculated at the predetermined intervals until the second equivalent ratio KACT2 converges to the target equivalent ratio after it exceeds the predetermined value KACTREF, i.e. until the oxygen is completely released from the catalyst 7. In the present embodiment, the second reducing agent amount integrated value sumkact2 corresponds to a downstream oxygen concentration parameter for comparison and an integrated value of a plurality of downstream oxygen concentration parameters, in the present invention.

Further, by executing the step 10, the calculation of the first reducing agent amount integrated value sumkact1 in the step 12 is carried out after the second equivalent ratio KACT2 becomes larger than the predetermined value KACTREF until it converges to the target equivalent ratio. As is clear from this fact and the above-mentioned method of setting the synchronized first equivalent ratio corKACT1 for calculating the first reducing agent amount integrated value sumkact1, the first reducing agent amount integrated value sumkact1 used for the calculation of the catalyst oxygen storage capability OSC represents an integrated value of a plurality of values of the upstream excess reducing agent amount (excess of reducing agents with respect to the amount of oxygen, determined with reference to the stoichiometric fuel-air ratio, in exhaust gases supplied to the catalyst 7) which is equal in number to a plurality of values of the above-mentioned downstream excess reducing agent amount, which are calculated at the predetermined intervals after the first equivalent ratio KACT1 exceeds the predetermined value KACTREF. In the present embodiment, the first reducing agent amount integrated value sumkact1 corresponds to the upstream oxygen concentration parameter for comparison and an integrated value of a plurality of values of the upstream oxygen concentration parameter.

From the above, the catalyst oxygen storage capability OSC which is calculated as the difference between the first reducing agent amount integrated value sumkact1 and the second reducing agent amount integrated value sumkact2 represents the amount of the reducing agents oxidized by the oxygen released from the catalyst 7, in other words, represents the oxygen storage capacity of the catalyst 7.

In a step 15 following the step 14, it is determined whether or not the catalyst oxygen storage capability OSC calculated in the step 14 is larger than a predetermined reference value OSCJUD. If the answer to the question of the step 15 is affirmative (YES), since the amount of the oxygen stored in the catalyst 7 is large enough, it is determined that the catalyst 7 is not deteriorated, and to indicate this fact, a catalyst deterioration flag F_CATNG is set to 0 (step 16), followed by terminating the present process. On the other hand, if the answer to the question of the step 15 is negative (NO), it is determined that the catalyst 7 is deteriorated, and to indicate this fact, the catalyst deterioration flag F_CATNG is set to 1 (step 17), followed by terminating the present process.

As described above, according to the present embodiment, the first reducing agent amount integrated value sumkact1 is calculated based on the first equivalent ratio KACT1 calculated and stored after switching exhaust gases to the reduction atmosphere, and after it exceeds the predetermined value KACTREF. Further, the second reducing agent amount integrated value sumkact2 is calculated based on the second equivalent ratio KACT2 which is calculated after it exceeds the same predetermined value KACTREF as described above. Thus, with reference to respective timings at which the first and second equivalent ratios KACT1 and KACT2 have actually exceeded the common predetermined value KACTREF, the first and second reducing agent amount integrated values sumkact1 and sumkact2 are calculated based on the first and second equivalent ratios KACT1 and KACT2 obtained thereafter, respectively.

More specifically, the second reducing agent amount integrated value sumkact2 is calculated by integrating a plurality of values of the downstream excess reducing agent amount which are calculated at the predetermined intervals after exceeding the predetermined value KACTREF until the second equivalent ratio KACT2 converges to the target equivalent ratio and reaches the steady state. This downstream excess reducing agent amount is calculated based on the second equivalent ratio KACT2, and represents the excess of reducing agents with respect to the amount of oxygen, determined with reference to the stoichiometric fuel-air ratio, in exhaust gases flowing from the catalyst 7 into the downstream side. From the above, an area of hatching A shown in FIG. 4 corresponds to the second reducing agent amount integrated value sumkact2.

Further, the first reducing agent amount integrated value sumkact1 is calculated by integrating a plurality of values of the upstream excess reducing agent amount, equal in number to the number of the above-mentioned plurality of values of the downstream excess reducing agent amount which are calculated sequentially after the second equivalent ratio KACT2 exceeds the predetermined value KACTREF. This upstream excess reducing agent amount is calculated based on the synchronized first equivalent ratio corKACT1, and represents the excess of reducing agents with respect to the amount of oxygen, with reference to the stoichiometric fuel-air ratio, in exhaust gases supplied to the catalyst 7. From the above, the sum of areas of the hatching A and hatching B appearing in FIG. 4 corresponds to the first reducing agent amount integrated value sumkact1.

Figure 4:
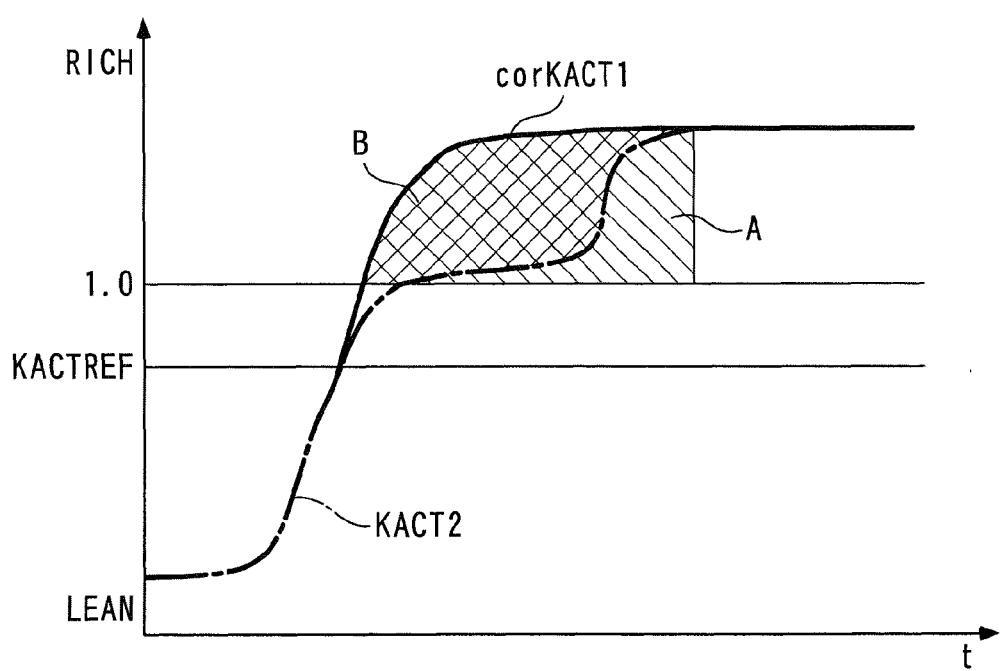
FIG. 4 is a diagram useful in explaining a method of calculating first and second reducing agent amount integrated values and a catalyst oxygen storage capability, which is employed in the deterioration determination process in FIG. 2.

Further, as described above, since the catalyst oxygen storage capability OSC is calculated by subtracting the second reducing agent amount integrated value sumkact2 from the first reducing agent amount integrated value sumkact1, the area of hatching B in FIG. 4 corresponds to the catalyst oxygen storage capability OSC. As is clear from FIG. 4, according to the present embodiment, timings at which the first equivalent ratio KACT1 set as the synchronized first equivalent ratio coKACT1 and the second equivalent ratio KACT2 exceed the common predetermined value KACTREF is defined as the common reference point in time series, and the first and second reducing agent integrated values sumkact1 and sumkact2 are calculated based on the respective same numbers of values of the first and second equivalent ratios KACT1 and KACT2 which are calculated at the predetermined intervals from the reference point.

From the above, the catalyst oxygen storage capability OSC corresponds to the integrated value of the difference between the downstream excess reducing agent amount and the upstream excess reducing agent amount which are calculated at each time when the same predetermined time period has elapsed after the both have exceeded the predetermined value KACTREF, out of a plurality of values of the downstream excess reducing agent amount calculated at the predetermined intervals until the second equivalent ratio KACT2 reaches the steady state after it exceeds the predetermined value KACTREF, and the same number of a plurality of values of the upstream excess reducing agent amount as the above-mentioned plurality of values of the the downstream excess reducing agent amount, which are calculated at the predetermined intervals after the first equivalent ratio KACT1 exceeds the predetermined value KACTREF. Therefore, even if there is a problem of the difference between individual products of the upstream and downstream LAF sensors 12 and 13, different mounting conditions of the sensors, or a response delay of output from each of the sensors 12 and 13 occurs which is caused by the aging thereof, the present deterioration determination is not affected thereby, and irrespective of length of a time period required for exhaust gases to reach the downstream LAF sensor 13 from the upstream LAF sensor 12, it is possible to use the values detected from substantially same exhaust gases by the both sensors 12 and 13 for the deterioration determination. Therefore, it is possible to accurately determine the deterioration of the catalyst 7.

Further, values of the second equivalent ratio KACT2 which are obtained until the second equivalent ratio KACT2 converges to the target equivalent ratio to reach the steady state, i.e. until the oxygen is completely released from the catalyst 7 after switching exhaust gases to the reduction atmosphere, are used for the calculation of the second reducing agent amount integrated value sumkact2. Therefore, it is possible to more properly calculate the catalyst oxygen storage capability OSC. Further, in calculating the catalyst oxygen storage capability OSC, the respective same numbers of values of the first and second equivalent ratios KACT1 and KACT2 are used which are calculated at the respective same timings with reference to the respective timings at which they exceed the common predetermined value KACTREF. This make it possible to further properly calculate the catalyst oxygen storage capability OSC. Furthermore, the first and second reducing agent amount integrated values sumkact1 and sumkact2 which are calculated by integrating values of the first and second equivalent ratios KACT1 and KACT2, respectively, are used for the deterioration determination. Therefore, even if the first and second equivalent ratios KACT1 and KACT2 are temporarily fluctuated by a disturbance or the like, it is possible to suppress the influence of the fluctuation on the deterioration determination.

It should be noted that in the above-mentioned deterioration determination process in FIG. 2, the second reducing agent amount integrated value sumkact2 is calculated as the integrated value of the plurality of values of the downstream excess reducing agent amount obtained until the release of oxygen from the catalyst 7 is completed after the second equivalent ratio KACT2 exceeds the predetermined value KACTREF, and the first reducing agent amount integrated value sumkact1 is calculated as the integrated value of the same number of the plurality of values of the upstream excess reducing agent amount as that of the plurality of values of the downstream excess reducing agent amount, which are obtained after the first equivalent ratio KACT1 exceeds the predetermined value KACTREF. In other words, although the number of values of the upstream excess reducing agent amount for calculation of the first reducing agent amount integrated value sumkact1 is made equal to the number of values of the downstream excess reducing agent amount for calculation of the second reducing agent amount integrated value sumkact2, inversely, the number of values of the downstream excess reducing agent amount for calculation of the second reducing agent amount integrated value sumkact2 may be made equal to the number of values of the upstream excess reducing agent amount for calculation of the first reducing agent amount integrated value sumkact1.

More specifically, the first reducing agent amount integrated value sumkact1 may be calculated as an integrated value of a plurality of values of the upstream excess reducing agent amount obtained until the release of oxygen from the catalyst 7 is completed after the first equivalent ratio KACT1 exceeds the predetermined value KACTREF, and the second reducing agent amount integrated value sumkact2 may be calculated as an integrated value of the same number of a plurality of values of the downstream excess reducing agent amount as that of the plurality of values of the upstream excess reducing agent amount, obtained after the second equivalent ratio KACT2 exceeds the predetermined value KACTREF.

Figure 5:
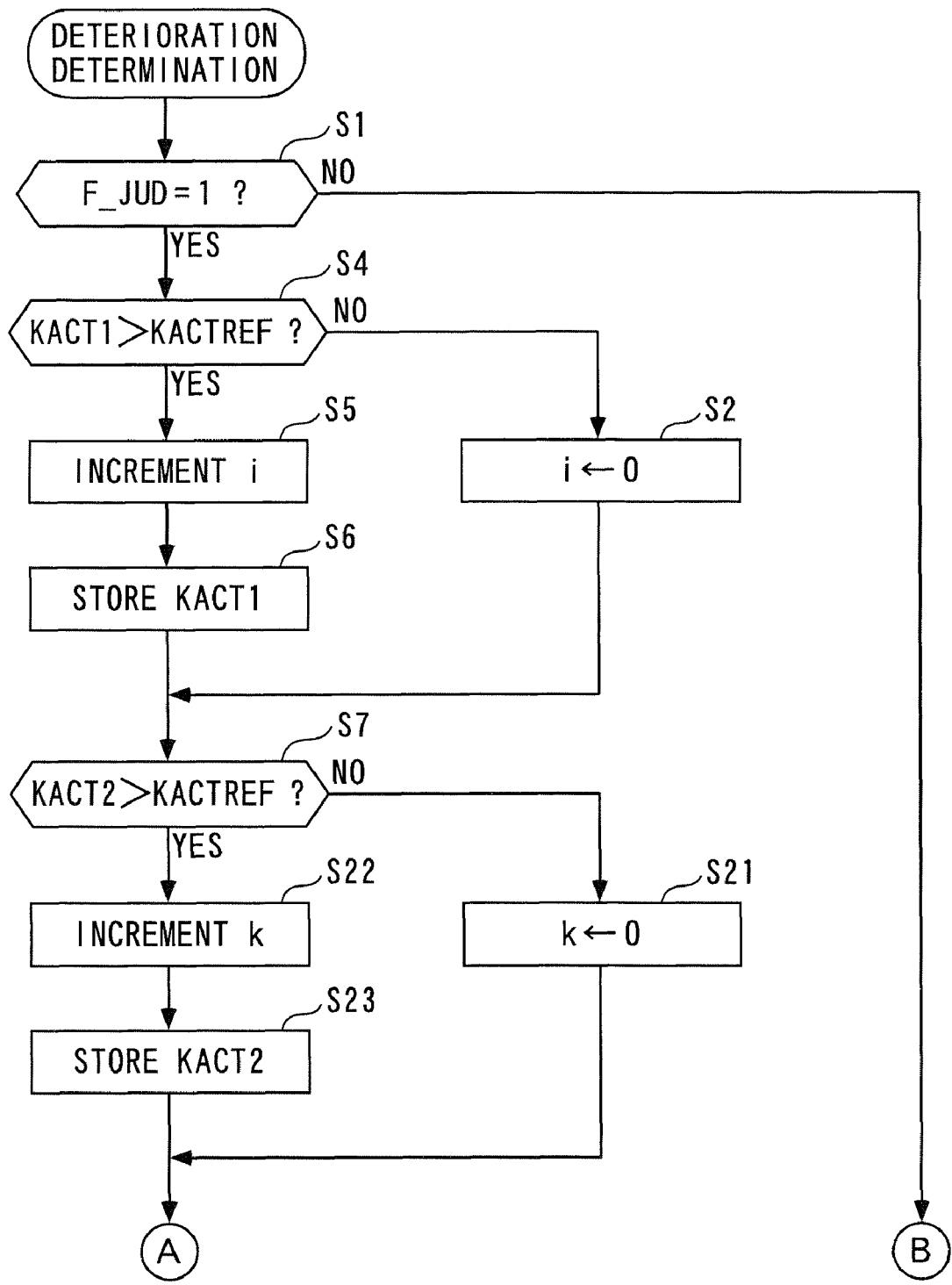
FIG. 5 is a flowchart of a variation of the deterioration determination process.
Figure 6:
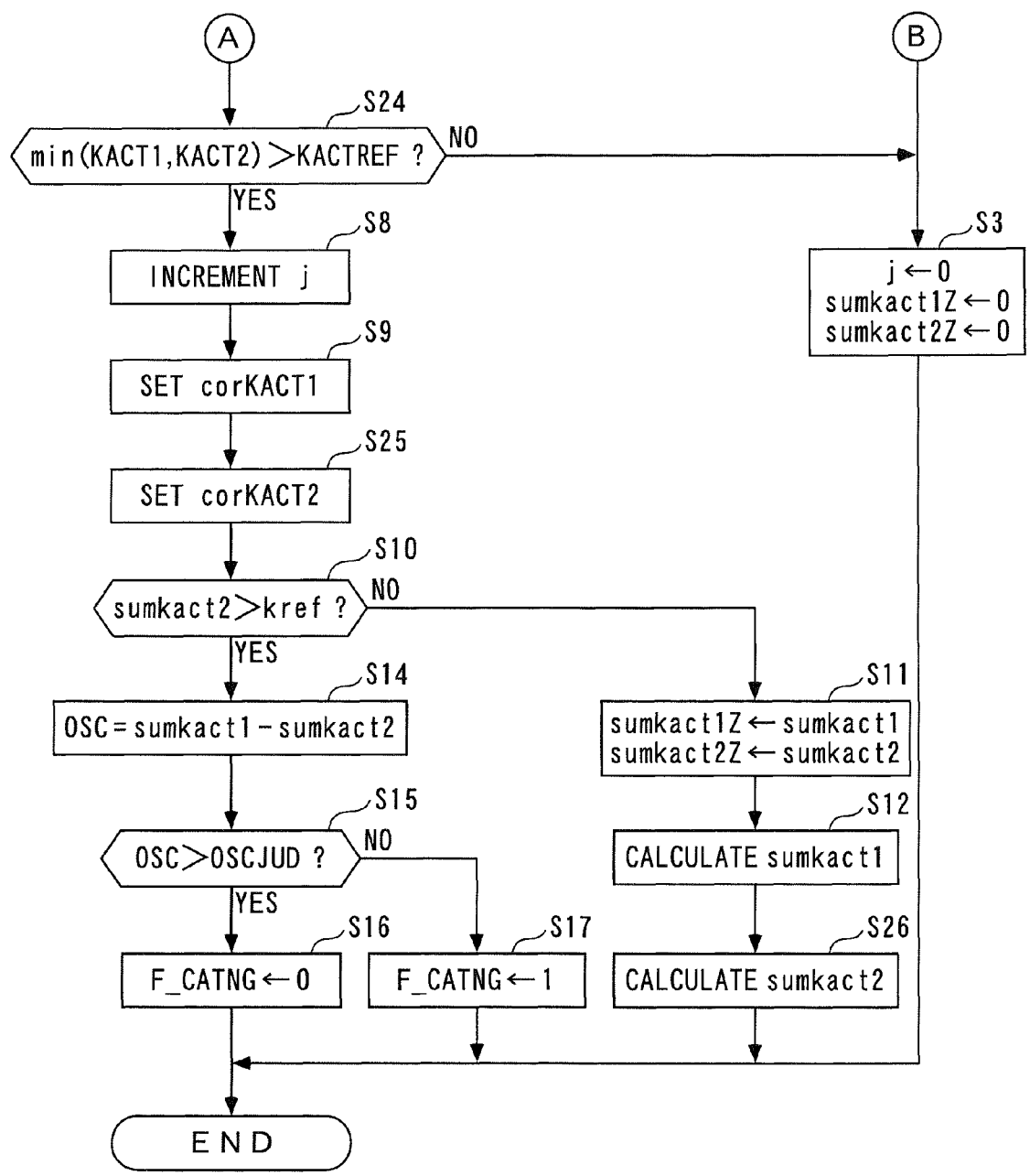
FIG. 6 is a continuation of the flowchart in FIG. 5.

FIGS. 5 and 6 show a variation of the deterioration determination process in FIG. 2. In FIGS. 5 and 6, steps identical to those of the deterioration determination process in FIG. 2 are denoted by the same step numbers, and the following description is given mainly of different steps from the deterioration determination process in FIG. 2.

If the answer to the question of the step 1 is negative (NO), i.e. if F_JUD=0 holds, the step 3 (FIG. 6) is executed to reset the counter value j of the counter, and the immediately preceding values sumkact1Z and sumkact2Z of the first and second reducing agent amount integrated values to 0, followed by terminating the present process. Further, if the answer to the question of the step 4 is affirmative (YES), i.e. if KACT1>KACTREF holds, similarly to the above-mentioned embodiment, the steps 5 and 6 are executed, whereas if the answer to the question of the step 4 is negative (NO), the step 2 is executed to reset the buffer number i to 0, and then the step 7 is executed. From the above, similarly to the above-mentioned deterioration determination process in FIG. 2, the first equivalent ratio KACT1 calculated at the predetermined intervals after it exceeds the predetermined value KACTREF is stored in a storage area having the buffer number i of the first ring buffer at the predetermined intervals. In this case, in the first ring buffer, a newer first equivalent ratio KACT1 is stored in a storage area having a larger buffer number i.

If the answer to the question of the step 7 is negative (NO), i.e. if KACT2≦KACTREF holds, a buffer number k of the second ring buffer of the ECU 2 is reset to 0 (step 21), whereas if the answer to the question of the step 7 is affirmative (YES), the buffer number k is incremented (step 22). Then, the current second equivalent ratio KACT2 calculated then is stored in a storage area of the second ring buffer, which is defined by the buffer number k incremented in the step 22 (step 23).

By executing the steps 7, and 21 to 23, the second equivalent ratio KACT2 calculated at the predetermined intervals after it exceeds the predetermined value KACTREF is stored in the storage area having the buffer number k of the second ring buffer at the predetermined intervals. In this case, in the second ring buffer, the newer second equivalent ratio KACT2 is stored in the storage area of the larger buffer number k.

In a step 24 in FIG. 6 following the step 21 or 23, it is determined whether or not the smaller one of the first and second equivalent ratios KACT1 and KACT2 is larger than the predetermined value KACTREF. If the answer to the question of the step 24 is negative (NO), the step 3 is executed, followed by terminating the present process, whereas, if the answer to the question of the step 24 is affirmative (YES), similarly to the deterioration determination process in FIG. 2, the counter value j of the counter is incremented (the step 8), and the first equivalent ratio KACT1 stored in the storage area having the buffer number i having the same value as the counter value j incremented in the step 8 is set to the synchronized first equivalent ratio corKACT1 (the step 9).

In a step 25 following the step 9, the second equivalent ratio KACT2 stored in the storage area having the buffer number k having the same value as the counter value j incremented in the step 8 is set to the synchronized second equivalent ratio corKACT2, and then the step 10 is executed.

By executing the above-mentioned steps 3, 24, 8, and 9, after the smaller one of the first and second equivalent ratios KACT1 and KACT2 exceeds the predetermined value KACTREF, values of the first equivalent ratio KACT1 sequentially stored after it exceeds the predetermined value KACTREF are set to respective values of the synchronized first equivalent ratio corKACT1, in a sequence starting from the oldest. Further, by executing the steps 3, 24, 8, and 25, after the smaller one of the first and second equivalent ratios KACT1 and KACT2 exceeds the predetermined value KACTREF, values of the second equivalent ratios KACT2 sequentially stored after it exceeds the predetermined value KACTREF are set to respective values of the synchronized second equivalent ratio corKACT2, in a sequence starting from the oldest.

Further, if the answer to the question of the step 10 is negative (NO) (sumkact2>kref), i.e. if the second equivalent ratio KACT2 does not reach the steady state, and the oxygen stored in the catalyst 7 has not been completely released, similarly to the deterioration determination process in FIG. 2, the steps 11 and 12 are executed. In a step 26 following the step 12, the second reducing agent amount integrated value sumkact2 is calculated, followed by terminating the present process.

The calculation of the second reducing agent amount integrated value sumkact2 is carried out, differently from the deterioration determination process in FIG. 2, in the following manner: If the second equivalent ratio KACT2 is not more than 1.0, the immediately preceding value sumkact2Z of the second reducing agent amount integrated value is directly set to the current second reducing agent amount integrated value sumkact2. On the other hand, if the second equivalent ratio KACT2 is more than 1.0, the second reducing agent amount integrated value sumkact2 is calculated by the following equation (3):

$$sumkact2=sumkact2Z+(corKACT2-1.0)GAIR \quad (3)$$

On the other hand, if the answer to the question of the step 10 is affirmative (YES), i.e. if the second equivalent ratio KACT2 has reached the steady state and the oxygen stored in the catalyst 7 has been completely released, similarly to the deterioration determination process in FIG. 2, the steps 14 to 17 are executed. In this case, as is clear from the above-described details of the steps, the second reducing agent amount integrated value sumkact2 used for the calculation of the catalyst oxygen storage capability OSC in the step 14 represents the integrated value of a plurality of values of the downstream excess reducing agent amount (excess of reducing agents with respect to the oxygen, determined with reference to the stoichiometric fuel-air ratio, in exhaust gases flowing from the catalyst 7 to the downstream side) which are calculated at the predetermined intervals until the release of the oxygen from the catalyst 7 is completed after the both of the first and second equivalent ratios KACT1 and KACT2 exceed the predetermined value KACTREF.

Further, the first reducing agent amount integrated value sumkact1 used for the calculation of the catalyst oxygen storage capability OSC in the step 14 represents the integrated value of a plurality of values of the upstream excess reducing agent amount (excess of reducing agents with respect to the amount of oxygen, determined with reference to the stoichiometric fuel-air ratio, in exhaust gases supplied to the catalyst 7) which are calculated at the predetermined intervals until the release of oxygen from the catalyst 7 is completed after both of the first and second equivalent ratios KACT1 and KACT2 exceed the predetermined value KACTREF. From the above, the catalyst oxygen storage capability OSC calculated in the present process also represents the oxygen storage capacity of the catalyst 7, similarly to that calculated in the deterioration determination in FIG. 2.

Figure 7:
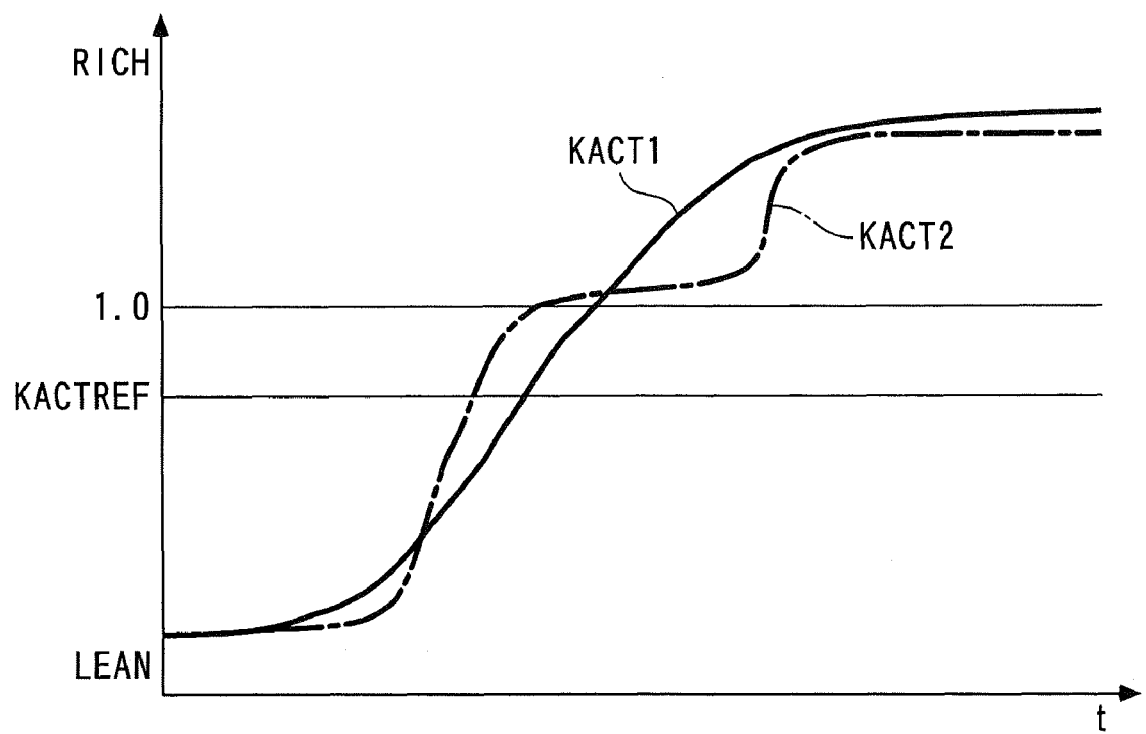
FIG. 7 is an example of changes in the first and second equivalent ratios in a case where the response delay of output from an upstream LAF sensor is large.

As described above, according the variation, the first and second reducing agent amount integrated values sumkact1 and sumkact2 are respectively calculated as the integrated values of a plurality of values of the upstream and downstream excess reducing agent amounts, which are calculated at the predetermined intervals until the release of oxygen from the catalyst 7 is completed after both of the first and second equivalent ratios KACT1 and KACT2 exceeds the predetermined value KACTREF. From the above, in both of a case where a timing at which the first equivalent ratio KACT1 exceeds the predetermined value KACTREF is later than that of the second equivalent ratio KACT2 due to the response delay of output caused by the deterioration of the upstream LAF sensor 12 as shown in FIG. 7, and a case where the timing is earlier than that of the second equivalent ratio KACT2 as shown in FIG. 3, it is possible to properly calculate the catalyst oxygen storage capability OSC, thereby making it possible to accurately carry out the deterioration determination.

It should be noted that in the deterioration determination process in FIG. 2, assuming that a timing at which the first equivalent ratio KACT1 exceeds the predetermined value KACTREF (hereinafter referred to as "the first equivalent ratio-based start timing") is earlier than a timing at which the second equivalent ratio KACT2 exceeds the predetermined value KACTREF (hereinafter referred to as "the second equivalent ratio-based start timing"), values of the first equivalent ratio KACT1 obtained after it exceeds the predetermined value KACTREF are stored, and further, the first equivalent ratio-based start timing is handled as the same timing in a time series as the second equivalent ratio-based start timing, whereby the deterioration determination is carried out. In place of this, in a case where it is expected that the first equivalent ratio-based start timing is later than the second equivalent ratio-based start timing (see FIG. 7), the second equivalent ratio-based start timing may be handled as the same timing in a time series as the first equivalent ratio-based start timing, and the deterioration determination may be carried out in the following manner:

From a time when the second equivalent ratio KACT2 exceeds the predetermined value KACTREF, values of the second equivalent ratios KACT2 are sequentially stored. Further, the integrated value of a plurality of values of the upstream excess reducing agent amount, which are calculated at the predetermined intervals until the release of oxygen from the catalyst 7 is completed after the first equivalent ratio KACT1 exceeds the predetermined value KACTREF, is calculated as the first reducing agent amount integrated value sumkact1. Furthermore, using stored values of the second equivalent ratio KACT2, the integral value of the same number of a plurality of values of the downstream excess reducing agent amount as that of the plurality of values of the upstream excess reducing agent amount, which are calculated at the predetermined intervals after the second equivalent ratio KACT2 exceeds the predetermined value KACTREF, is calculated as the second reducing agent amount integrated value sumkact2. Then, the difference between the first and second reducing agent amount integrated values sumkact1 and sumkact2 thus calculated may be calculated as the catalyst oxygen storage capability OSC, and the deterioration may be determined based on the calculated catalyst oxygen storage capability OSC.

It should be noted that the present invention is by no means limited to the above-described embodiment (including the variation), but it can be practiced in various forms. For example, although in the above-mentioned embodiment, the upstream and downstream LAF sensors 12 and 13 which are capable of linearly detecting the oxygen concentration in exhaust gases are employed as the upstream and downstream oxygen concentration parameter sensors in the present invention, any other desired types of sensors may be employed, insofar as they are sensors capable of detecting an oxygen concentration parameter indicative of an oxygen concentration in exhaust gases. For example, there may be employed an oxygen concentration sensor of a so-called binary type which outputs one of a maximum value and a minimum value when the air-fuel ratio of the mixture is richer than the stoichiometric air-fuel ratio, and outputs the other of the maximum value and the minimum value when the air-fuel ratio of the mixture is leaner than the stoichiometric air-fuel ratio.

Further, although in the above-mentioned embodiment, the first and second equivalent ratios KACT1 and KACT2 are employed as the upstream and downstream oxygen concentration parameters in the present invention, respectively, any other desired parameters may be employed insofar as they are parameters indicative of an oxygen concentration in exhaust gases. For example, since the concentration of reducing agents, such as HC and CO, in exhaust gases has a correlation with the concentration of oxygen, the concentration of reducing agents in exhaust gases on the upstream side and downstream side of the catalyst 7 may be employed as the upstream and downstream oxygen concentration parameters, respectively. Further, although in the above-described embodiment, the control of exhaust gases between the oxidation atmosphere and the reduction atmosphere is carried out by controlling the amount of fuel injected into the combustion chamber 3$a$, the control may be carried out by directly supplying fuel or urea as a reducing agent to the upstream side of the upstream LAF sensor 12 in the exhaust pipe 5.

Further, although in the above-described embodiment, the deterioration of the catalyst 7 is determined based on the results of comparison between the first and second reducing agent amount integrated values sumkact1 and sumkact2, the deterioration of the catalyst 7 may be determined based on results of comparison between the representative one or more than one value of the first equivalent ratio KACT1 obtained after the first equivalent ratio KACT1 exceeds the predetermined value KACTREF, and the representative one or more than one value of the second equivalent ratio KACT2 obtained after the second equivalent ratio KACT2 exceeds the predetermined value KACTREF. In this case, respective values of the first and second equivalent ratios KACT1 and KACT2 obtained upon the lapse of a common predetermined time period after they exceed the predetermined value KACTREF are used for the deterioration determination. Further, although in the above-described embodiment, the catalyst oxygen storage capability OSC is calculated by the difference between the first reducing agent amount integrated value sumkact1 obtained by integrating values of the upstream excess reducing agent amount, and the second reducing agent amount integrated value sumkact2 obtained by integrating values of the downstream excess reducing agent amount, the catalyst oxygen storage capability OSC may be calculated by calculating the difference between each value of the upstream excess reducing agent amount and a corresponding value of the downstream excess reducing agent amount, and integrating the calculated difference between the two values.

Further, although in the above-mentioned embodiment, the first and second reducing agent amount integrated values sumkact1 and sumkact2 are calculated by integrating respective values of the upstream and downstream excess reducing agent amounts, they may be calculated by directly integrating values of the first and second equivalent ratios KACT1 and KACT2, respectively. Furthermore, although in the above-mentioned embodiment, the catalyst 7 is a three-way catalyst, any other desired catalyst may be employed insofar as it is a catalyst of a type which stores oxygen in exhaust gases when the exhaust gases form the oxidation atmosphere, and release the stored oxygen to reduce exhaust emissions when the exhaust gases form the reduction atmosphere. For example, there may be employed an oxidation catalyst, or an NOx catalyst which traps NOx in exhaust gases when the exhaust gases form the oxidation atmosphere, and reduces the trapped NOx when the exhaust gases form the reduction atmosphere. Furthermore, although in the above-described embodiment, the engine 3 as the internal combustion engine in the present invention is the diesel engine installed on a vehicle, this is not limitative, but it may be any of a gasoline engine, an engine fueled by liquefied petroleum gas, engines for ship propulsion machines, such as an outboard motor having a vertically-disposed crankshaft, and other various engines for use in the industry.

It is further understood by those skilled in the art that the foregoing are preferred embodiments of the invention, and that various changes and modifications may be made without departing from the spirit and scope thereof.

What is claimed is:

1. A deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, comprising:
   an upstream oxygen concentration parameter sensor that detects an upstream oxygen concentration parameter indicative of an oxygen concentration in exhaust gases on an upstream side of the catalyst in the exhaust passage;
   a downstream oxygen concentration parameter sensor that detects a downstream oxygen concentration parameter indicative of an oxygen concentration in the exhaust gases on a downstream side of the catalyst in the exhaust passage;
   control means configured to control the exhaust gases flowing through said upstream oxygen concentration parameter sensor into the catalyst, between the oxidation atmosphere and the reduction atmosphere; and
   deterioration determining means configured to determine a deterioration of the catalyst based on a result of comparison between the upstream oxygen concentration parameter for comparison which is detected when a first predetermined time period elapses after the upstream oxygen concentration parameter exceeds a first predetermined value, and the downstream oxygen concentration parameter for comparison which is detected when a second predetermined time period, which is equal to the first predetermined time period, elapses after the downstream oxygen concentration parameter exceeds a second predetermined value, which is equal to the first predetermined value, after said control means switches the exhaust gases from the oxidation atmosphere to the reduction atmosphere.

2. A deterioration determination device as claimed in claim 1, further comprising:
   steady state-determining means for determining whether or not the downstream oxygen concentration parameter reaches a steady state after switching of the exhaust gases, and
   wherein the upstream and downstream oxygen concentration parameters for comparison are detected within a time period after the switching of the exhaust gases until it is determined that the downstream oxygen concentration parameter reaches the steady state.

3. A deterioration determination device as claimed in claim 1, wherein the upstream oxygen concentration parameter for comparison comprises a plurality of values of the upstream oxygen concentration parameter which are detected at predetermined intervals after the upstream oxygen concentration parameter exceeds the predetermined value, and
   wherein the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

4. A deterioration determination device as claimed in claim 3, further comprising:
   upstream oxygen concentration parameter integrated value-calculating means for calculating an integrated value of the plurality of values of the upstream oxygen concentration parameter as the upstream oxygen concentration parameter for comparison; and
   downstream oxygen concentration parameter integrated value-calculating means for calculating an integrated value of the plurality of values of the downstream oxygen concentration parameter as the downstream oxygen concentration parameter for comparison,
   wherein said deterioration determining means executes the deterioration determination based on a result of comparison between the integrated value of the upstream oxygen concentration parameter and the integrated value of the downstream oxygen concentration parameter.

5. A catalyst deterioration-determining method for a deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, the deterioration determination device including an upstream oxygen concentration parameter sensor that detects an upstream oxygen concentration parameter indicative of an oxygen concentration in exhaust gases on an upstream side of the catalyst in the exhaust passage, a downstream oxygen concentration parameter sensor that detects a downstream oxygen concentration parameter indicative of an oxygen concentration in the exhaust gases on a downstream side of the catalyst in the exhaust passage, and control means configured to control the exhaust gases flowing through the upstream oxygen concentration parameter sensor into the catalyst, between the oxidation atmosphere and the reduction atmosphere, the catalyst deterioration-determining method comprising:
   switching the exhaust gases from the oxidation atmosphere to the reduction atmosphere;
   detecting the upstream oxygen concentration parameter;
   detecting the downstream oxygen concentration parameter; and
   determining deterioration of the catalyst based on a result of comparison between the upstream oxygen concentration parameter for comparison which is detected when a first predetermined time period elapses after the upstream oxygen concentration parameter exceeds a first predetermined value, and the downstream oxygen concentration parameter for comparison which is detected when a second predetermined time period, which is equal to the first predetermined time period, elapses after the downstream oxygen concentration parameter exceeds a second predetermined value, which is equal to the first predetermined value.

6. A catalyst deterioration-determining method as claimed in claim 5, further comprising determining whether or not the downstream oxygen concentration parameter reaches a steady state after switching of the exhaust gases, and wherein the upstream and downstream oxygen concentration parameters for comparison are detected within a time period after the switching of the exhaust gases until it is determined that the downstream oxygen concentration parameter reaches the steady state.

7. A catalyst deterioration-determining method as claimed in claim 5, wherein the upstream oxygen concentration parameter for comparison comprises a plurality of values of the upstream oxygen concentration parameter which are detected at predetermined intervals after the upstream oxygen concentration parameter exceeds the predetermined value, and wherein the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

8. A catalyst deterioration-determining method as claimed in claim 7, further comprising:

calculating an integrated value of the plurality of values of the upstream oxygen concentration parameter as the upstream oxygen concentration parameter for comparison; and calculating an integrated value of the plurality of values of the downstream oxygen concentration parameter as the downstream oxygen concentration parameter for comparison, wherein said determining is executed based on a result of comparison between the integrated value of the upstream oxygen concentration parameter and the integrated value of the downstream oxygen concentration parameter.

9. An engine control unit including a control program for causing a computer to execute a catalyst deterioration-determining method for a deterioration determination device for determining deterioration of a catalyst that is provided in an exhaust passage of an internal combustion engine, and has an oxygen storage capability for storing oxygen in exhaust gases exhausted from the engine when the exhaust gases form an oxidation atmosphere, the catalyst releasing stored oxygen when the exhaust gases form a reduction atmosphere, and reducing exhaust emissions, the deterioration determination device including an upstream oxygen concentration parameter sensor that detects an upstream oxygen concentration parameter indicative of an oxygen concentration in exhaust gases on an upstream side of the catalyst in the exhaust passage, a downstream oxygen concentration parameter sensor that detects a downstream oxygen concentration parameter indicative of an oxygen concentration in the exhaust gases on a downstream side of the catalyst in the exhaust passage, and control means configured to control the exhaust gases flowing through the upstream oxygen concentration parameter sensor into the catalyst, between the oxidation atmosphere and the reduction atmosphere, wherein the catalyst deterioration-determining method comprises:

switching the exhaust gases from the oxidation atmosphere to the reduction atmosphere;

detecting the upstream oxygen concentration parameter;

detecting the downstream oxygen concentration parameter; and determining deterioration of the catalyst based on a result of comparison between the upstream oxygen concentration parameter for comparison which is detected when a first predetermined time period elapses after the upstream oxygen concentration parameter exceeds a first predetermined value, and the downstream oxygen concentration parameter for comparison which is detected when a second predetermined time period, which is equal to the first predetermined time period, elapses after the downstream oxygen concentration parameter exceeds a second predetermined value, which is equal to the first predetermined value.

10. An engine control unit as claimed in claim 9, wherein the catalyst deterioration-determining method further comprises determining whether or not the downstream oxygen concentration parameter reaches a steady state after switching of the exhaust gases, and wherein the upstream and downstream oxygen concentration parameters for comparison are detected within a time period after the switching of the exhaust gases until it is determined that the downstream oxygen concentration parameter reaches the steady state.

11. An engine control unit as claimed in claim 9, wherein the upstream oxygen concentration parameter for comparison comprises a plurality of values of the upstream oxygen concentration parameter which are detected at predetermined intervals after the upstream oxygen concentration parameter exceeds the predetermined value, and wherein the downstream oxygen concentration parameter for comparison comprises a plurality of values of the downstream oxygen concentration parameters equal in number to a number of the plurality of values of the upstream oxygen concentration parameter, which are detected at the predetermined intervals after the downstream oxygen concentration parameter exceeds the predetermined value.

12. An engine control unit as claimed in claim 11, wherein the catalyst deterioration-determining method further comprises:

calculating an integrated value of the plurality of values of the upstream oxygen concentration parameter as the upstream oxygen concentration parameter for comparison; and calculating an integrated value of the plurality of values of the downstream oxygen concentration parameter as the downstream oxygen concentration parameter for comparison, wherein said determining is executed based on a result of comparison between the integrated value of the upstream oxygen concentration parameter and the integrated value of the downstream oxygen concentration parameter.

* * * * *